United States Patent [19]

Miyake

[11] Patent Number: 5,631,701
[45] Date of Patent: May 20, 1997

[54] IMAGE DATA TRANSFER SYSTEM OPERABLE WITH AN ELECTRONIC STILL CAMERA

[75] Inventor: Izumi Miyake, Asaka, Japan

[73] Assignee: Fuji Photo Film Co., Ltd., Kanagawa, Japan

[21] Appl. No.: 598,917

[22] Filed: Feb. 9, 1996

[30] Foreign Application Priority Data

Feb. 14, 1995 [JP] Japan ................................... 7-025233

[51] Int. Cl.$^6$ .................................................. H04N 5/228
[52] U.S. Cl. ........................... 348/222; 348/233; 348/552; 358/909.1
[58] Field of Search .................................. 348/222, 231, 348/233, 552; 358/909.1; H04N 5/228, 5/76

[56] References Cited

U.S. PATENT DOCUMENTS

| 5,226,145 | 7/1993 | Moronaga | 348/231 |
| 5,434,618 | 7/1995 | Hayashi | 348/231 |
| 5,477,264 | 12/1995 | Sarbadhikari | 348/231 |
| 5,486,853 | 1/1996 | Baxter | 348/222 |

FOREIGN PATENT DOCUMENTS

| 0583666 | 4/1993 | Japan . |
| 7288767 | 10/1995 | Japan . |

*Primary Examiner*—Sherrie Hsia

[57] ABSTRACT

In an image data transfer system including an electronic still camera and equipment separably connected to the camera, the camera has an imaging device for shooting a desired subject. A signal converter converts an image signal generated by the imaging device to digital image data. A data processor executes predetermined image processing with the digital image data. A transmitting section sends the processed image data output from the data processor to the equipment. A controller controls the transmitting section in such a manner as to control a transfer rate for transferring the image data to the equipment. The equipment has a receiving section connected to the transmitting section of the camera by a data line for transferring the image data, and a control line for reporting to the camera the permission/inhibition of data transfer from the camera by using an ON/OFF control signal. The controller controls, at the time of transfer of the image data to the equipment, the transmitting section so as to send a transfer rate set command representative of a transfer rate to the equipment over the data line. In response, the receiving section reports to the camera whether or not the equipment accepts the transfer rate by varying the ON/OFF control signal in the form of pulses.

20 Claims, 8 Drawing Sheets

DATA TRANSFER

TRANSFER RATE SETTING

IMAGE DATA TRANSFER SYSTEM OPERABLE WITH AN ELECTRONIC STILL CAMERA

BACKGROUND OF THE INVENTION

1. Field of the Invention

The present invention relates to an image data transfer system operable with an electronic still camera and, more particularly, to an image data transfer system feasible for the transfer of image data generated an electronic still camera to a personal computer or similar equipment connected thereto.

2. Description of the Background Art

An image data transfer system is conventional in which image data representative of an image picked up by a digital electronic still camera or similar image pick-up device are sent to desired equipment connected to the camera. For example, Japanese patent laid-open publication No. 83666/1993 teaches a system for recording and reproducing images picked up. Japanese patent application No. 101740/1994 discloses an electronic still camera, and a method of sending image data generated thereby.

In the above image recording and reproducing system, when a camera shoots a desired subject, an image representative of the subject is incident on a CCD (Charge Coupled Device) image sensor or similar imaging device via a lens. In response, the imaging device generates image signals in the form of YC signals consisting of a luminance signal y and chrominance signals C. The image signals or YC signals are sent as analog or digital image data from the camera to DAT (Digital Audio Tape) or similar recording and reproducing equipment connected to the camera. In the equipment connected to the camera, the image data are written to a digital audio tape and then read thereoutof to be reproduced on, e.g., a display. The camera and DAT equipment are connected to each other by an exclusive transfer cable. The camera sends the image data to the DAT equipment over the cable in response to synchronizing pulses generated by a timing signal generator which is built in the camera.

In the prior art electronic still camera and image data transfer method mentioned previously, image signals representative of a subject picked up by a CCD image sensor or similar imaging device are transformed to digital YC signals, compressed by a preselected compression scheme, and then recorded in a semiconductor memory, e.g., a memory card removably mounted to the camera. The compressed image data are read out of the memory card and then sent to a computer system via serial communication interfaces respectively included in the camera and computer system. The interfaces are based on, e.g., RS-232C or RS-422 as prescribed by EIA (Electronic Industries Association) standards. A printer or similar peripheral is connected to the computer system. The RS-232C or RS-422 interfaces are connected to each other by a cable including a data line assigned to the image data, and a control line assigned to a control signal which is selectively controlled to an ON state or to an OFF state. For example, when the control signal being sent from the computer system to the camera is in an ON state, image data are transferred from the camera to the computer system over the data line. The data transfer from the camera is interrupted when the control signal goes OFF, and then resumed when it again goes ON. On receiving the compressed image data, the computer system expands them, and displays the expanded image data or prints them out.

However, in both of the above conventional systems, the camera is operable only with a particular kind of equipment, and therefore knows the transfer rate available with the equipment before the connection of the equipment. Particularly, the former system does not include RS-232C or similar communication interfaces having a variable transfer rate, so that the image data must be transferred only at a transfer rate particular to the camera. The latter system including the RS-232C or similar communication interfaces is capable of varying the transfer rate within a certain range. However, even the latter system has a drawback that a particular transfer rate matching a processing speed available with the computer must be set on, e.g., a dip switch beforehand.

Generally, not only the exclusive equipment but also a general-purpose personal computer is capable of receiving the image data. However, when a personal computer receives serial data, the transfer rate depends on the hardware characteristic of the computer. Of course, if the communication between the image pick-up device and the computer is bidirectional, they can interchange information in order to set up a compatible transfer rate. However, an electronic still camera or similar miniature apparatus has only a limited number of pins on its connector and only a limited drive circuit scale. Hence, an additional data line is not desirable with this kind of apparatus. In this condition, the sending station must be matched in transfer rate to the receiving station.

SUMMARY OF THE INVENTION

It is therefore an object of the present invention to provide an image data transfer system operable with an electronic still camera, and allows the camera to automatically set, before sending image data, a transfer rate matching receiving equipment even if the equipment is general-purpose equipment.

In accordance with the present invention, in an image data transfer system including an electronic still camera and equipment separably connected to the camera, the camera has an imaging device for shooting a desired subject. A signal converter converts an image signal generated by the imaging device into digital image data. A data processor executes predetermined image processing with the digital image data. A transmitting section sends the processed image data output from the data processor to the equipment. A controller controls the transmitting section in such a manner as to control a transfer rate for transferring the image data to the equipment. The equipment has a receiving section connected to the transmitting section of the camera by a data line for transferring the image data, and a control line for reporting to the camera the permission/inhibition of data transfer from the camera by using an ON/OFF control signal. The controller controls, at the time of transfer of the image data to the equipment, the transmitting section so as to send a transfer rate set command representative of a transfer rate to the equipment over the data line. In response, the receiving section reports to the camera whether or not the equipment accepts the transfer rate by varying the ON/OFF control signal in the form of pulses.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
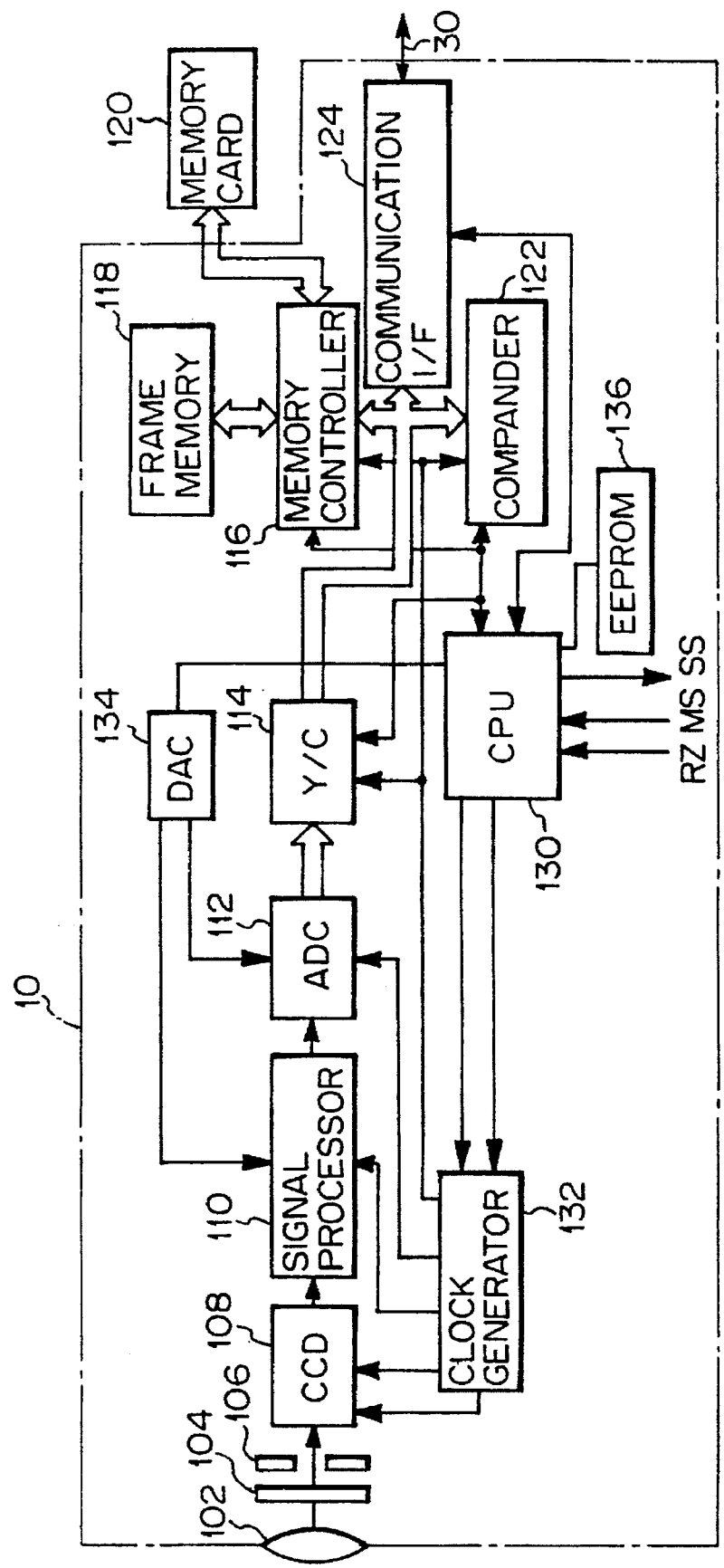
FIG. 1 is a block diagram schematically showing an electronic still camera forming part of an image data transfer system embodying the present invention.
Figure 2:
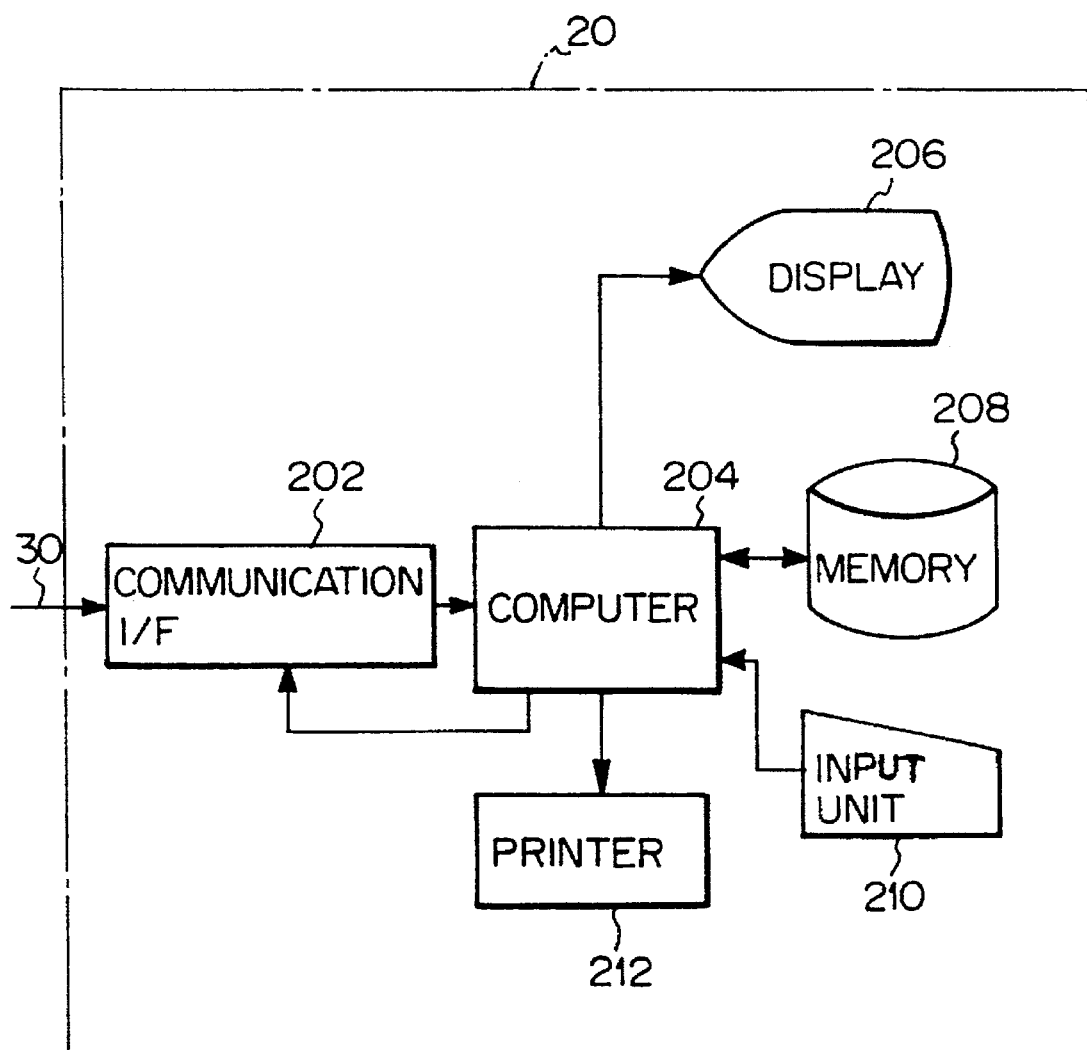
FIG. 2 is a block diagram schematically showing a specific construction of equipment connected to the camera of FIG. 1, and forming the other part of the embodiment.

Referring to FIGS. 1 and 2 of the drawings, an image data transfer system embodying the present invention and applicable to an electronic still camera is shown. FIG. 1 shows an electronic still camera 10 while FIG. 2 shows a personal computer system or similar general-purpose equipment 20. As shown, the camera and equipment 20 are separably connected to each other by a cable 30 via RS-422 interfaces which will be described. The cable 30 is made up of a data line and a control line. Particularly, in the illustrative embodiment, the camera 10 sequentially sends, before sending image data, a plurality of transfer rate set commands each being representative of a particular transfer rate to the equipment 20 over the data line. In response, the equipment 20 returns to the camera 10 over the control line an answer indicative of one of the transfer rates at which it can receive the image data. Then, the camera 10 sends the image data at the transfer rate accepted by the equipment 20. It is to be noted that the parts of the system not directly relevant to the understanding of the present invention are not shown or described for simplicity.

The camera 10 focuses an image representative of a desired subject onto an imaging device 108 via a lens 102, a shutter 104, and an iris 106. The imaging device 108 may advantageously be implemented by a CCD image sensor or similar solid-state imaging device. The imaging device 108 is a photoelectric transducer for transforming the incident image to electric signals representative of, e.g., a red (R) component, a green (G) component, and a blue (B) component. The resulting analog RGB image signals are fed from the imaging device 108 to a signal processor 110.

The signal processor 110 has a clamping circuit for maintaining the DC levels of the input RGB signals constant, a white balance adjusting circuit for adjusting the white balance, a gamma correcting circuit for correcting the gamma characteristic, and other conventional circuits necessary for image processing, although not shown or described specifically. The analog image signals undergoing the above processing are applied to an analog-to-digital converter (ADC) 112. The ADC 112 converts the individual RGB image signal to corresponding digital RGB image data having eight bits to ten bits in accordance with the level of the image signal. The digital RGB image data are fed to a Y (luminance)/C (chrominance) processor 114 in parallel.

The Y/C processor 114 generates YC image data representative of a luminance signal Y and chrominance signals C out of the input RGB image data. The Y/C processor 114 includes a preselected matrix computing circuit, although not shown specifically. When the camera 10 is operated in an ordinary shoot mode, the YC image data output from the processor 114 are once written to a frame memory 118 via a memory controller 116 under the control of a control processor or CPU (Central Processing Unit) 130. In the embodiment, when a data transfer mode is selected, the YC image data generated by the processor 114 can be sent from the camera 10 to the equipment 20 via a communication interface (I/F) 124 built in the camera 10. In the data transfer mode, whether or not to compress the YC image data is determined on the basis of the functions available with the equipment 20.

The memory controller 116 controls the writing and reading of the YC image data out of the frame memory 118. In the embodiment, the controller 116 includes a card interface for allowing the image data to be written and read out of a memory card 120. The frame memory 118 is an image buffer capable of storing more than one frame of image data at least picked up and converted to YC data. In the illustrative embodiment, the memory 118 is advantageously used as a work buffer for a compander 122 which will be described later.

The memory card 120 is a card-like recording medium loaded with an SRAM (Static Random Access Memory), EEPROM (Electrically Erasable Programmable Read Only Memory) or similar semiconductor memory. The card 120 is removably mounted to the camera 10, as desired. In the embodiment, the image data compressed by the compander 122 may advantageously be written to the card 120 in consideration of the capacity of the above semiconductor memory. Of course, if the memory has a sufficient capacity, the image data may be directly written thereto without being compressed. For the control over the image data, a data control system using a file allocation table (FAT) may advantageously be used. The FAT type system supervises a memory area as clusters each having a preselected capacity, and records image data in a single cluster or over a plurality of clusters. This kind of system deals with, e.g., information representative of links between the clusters by use of the FAT and directory. The FAT type system is particularly desirable when the image data are not compressed, because non-compressed image data are recorded over a plurality of clusters. The image data stored in the card 120 may be read out and sent to the equipment 20 later, as desired.

The compander 122 selectively compresses or expands the YC image data by using a preselected compression coding system. In the illustrative embodiment, use is preferably made of a JPEG (Joint Photographic Expert Group) type compansion system. The compander 122 is a data processing section including a quantizing and dequantizing circuit, an orthogonal transform and reverse orthogonal transform circuit, and a coding and decoding circuit, although not shown specifically. The compander 122 is used, e.g., when the image data are compressed and then written to the memory card 120 via the memory controller 116, or compressed and then transferred to the equipment 20 via the communication I/F 124. On the other hand, when the compressed image data are read out of the card 120, the compander 122 expands the data and then sends them to, e.g., a display via a reproducing section, not shown, or expands the data and then transfers them to the equipment 20.

The communication I/F 124 is a balanced driver-receiver based on RS-422 and capable of sending the compressed or non-compressed image data bit-serially. For example, the I/F 124 is capable of sending the above data at a maximum transfer rate of higher than 1 Mbps (megabits per second). In the illustrative embodiment, the transfer rate of the I/F 124 is variable over a range of from 9,600 bps (bits per second) to 500 kbps (kilobits per second) under the control of the CPU 130, depending on the functions available with the equipment 20.

In the embodiment, the CPU or main controller 130 controls the pick-up of a subject, the writing and reading of data out of the memory card 120, the sending of data to the equipment 20, and other operations of the camera 10 in response to the manipulation of various buttons arranged on the camera 10 and including a release button, not shown. Specifically, a release signal RZ appearing at the time of shooting, and a mode signal MS indicative of the writing, reading, or sending of data are fed to the CPU 130. In response, the CPU 130 causes a display, not shown, to display a control status SS based on the input signals RZ and MS. For example, at the time of shooting, the CPU 130 drives a clock generator 132 to cause it to feed timing signals to the various sections of the camera 10. At the same time, the CPU 130 sets processing data in the signal processor 110 and ADC 112, so that they can execute optimal processing. An EEPROM 136 is connected to the CPU 130 and stores the above processing data to be set by the CPU 130. The processing data include gamma correction coefficients for the signal processor 110, and conversion coefficients for the ADC 112. A digital-to-analog converter (DAC) 134 is connected to the signal processor 110, ADC 112, and CPU 130. The DAC 134 transforms the processing data output from the CPU 130 to analog data, e.g., transforms a gamma correction coefficient, conversion coefficient and other coefficients to voltage values, and delivers them to the signal processor 110, ADC 112, etc.

Further, in the illustrative embodiment, the CPU 130 sends a transfer rate set command indicative of one of the transfer rates of 9,600 bps to 500 kbps to the equipment 20 via the communication I/F 124 over the data line of the cable 30. On receiving a response to the command from the equipment 20, the CPU 130 determines which of the transfer rates is accepted by the equipment 20, and then sets the accepted transfer rate in the I/F 124. The above response from the equipment 20 is implemented as a pulse or pulses, as will be described specifically later. The CPU 130 determines how many times the pulse from the equipment 20 has been input to the I/F 124 within a predetermined period of time. For this purpose, the CPU 130 includes a timer for counting the predetermined period of time, and a pulse counter for counting the input pulses.

As shown in FIG. 2, the equipment 20 to which the image data may be sent from the camera 10 is a system including, e.g., a general-purpose personal computer 204. The equipment 20 is connected to the cable 30 via a communication I/F 202 which is based on RS-422 like the I/F 124 of the camera 10. While the I/F 202 is shown as being connected to the personal computer 204, it may, of course, be built in the computer 204. Further, if the computer 204 is of the type having an RS-232C interface terminal, the I/F 202 may advantageously be implemented by an interface having an RS-422/RS-232C conversion capability. An RS-232C interface is adaptive to a nominal transfer rate of 20 kbps, and to a transfer rate of about 100 kbps in a short range. Hence, such a transfer rate is set in the communication I/F 202. In the illustrative embodiment, the computer 204 is loaded with control software for controlling the I/F 202.

The communication I/F 202 includes a receiver for receiving the image data from the camera 10 over the data line of the cable 30, and a driver for sending a control signal to the camera 10 over the control line of the cable 30. The control signal is provided with an ON state when equipment 20 admits the transmission of the data, or with an OFF state when it inhibits the transmission, under the control of the computer 204. Particularly, in the embodiment, when the I/F 202 receives the previously mentioned transfer rate set command from the camera 10 before the image data, it answers the camera 10 by varying the control signal in the form of pulses. For example, on receiving a first transfer rate set command, and if the transfer rate indicated by the command is not acceptable, the I/F 202 sends a single pulse to the camera 10 while superposing it on the control signal held in the ON state. If the indicated transfer rate is acceptable, the I/F 202 sends two pulses to the camera 10 while superposing them on the control signal also held in the ON state.

Figure 3:
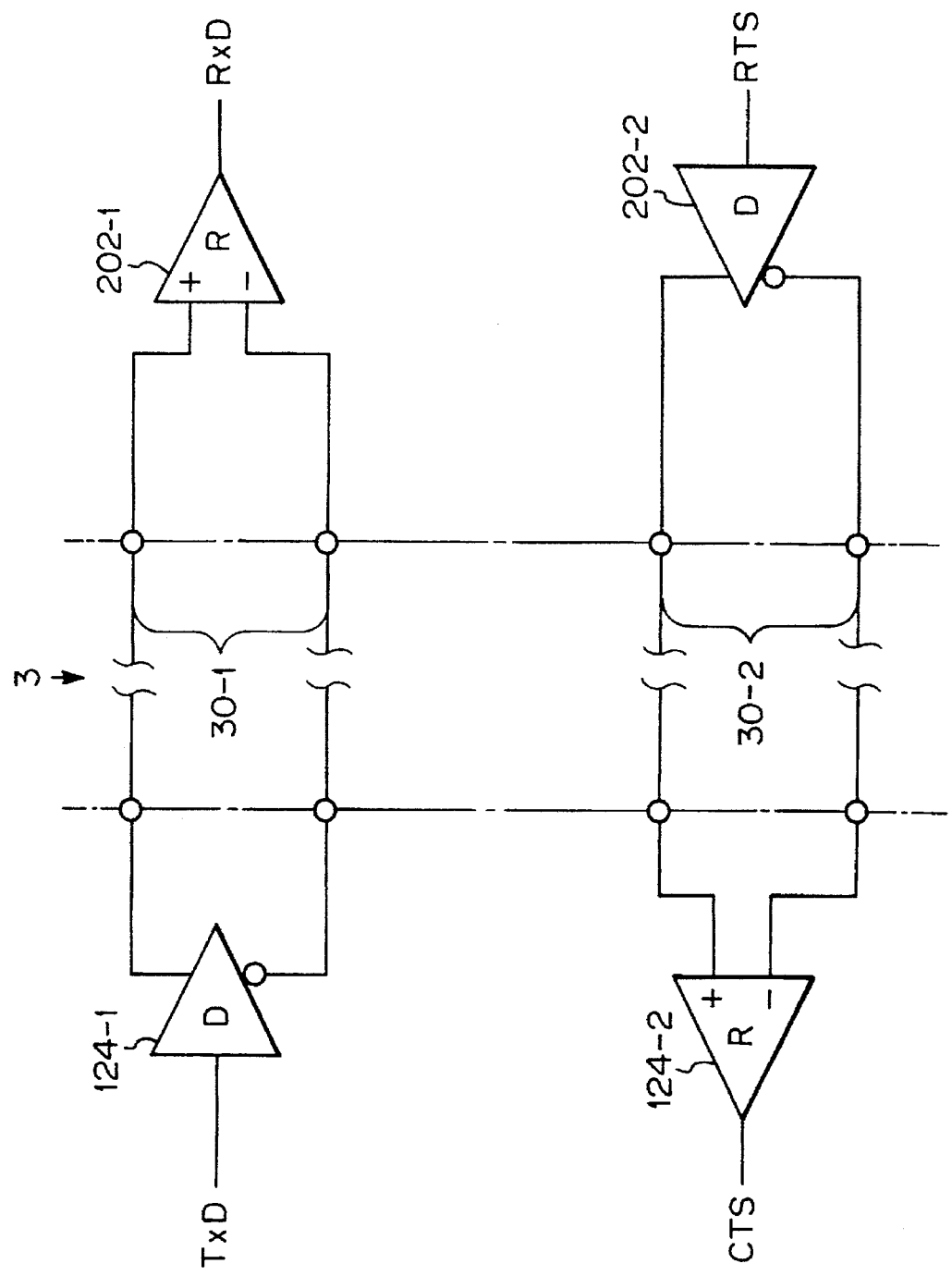
FIG. 3 is a schematic block diagram representative of the connection of communication interfaces included in the embodiment.
Figure 4:
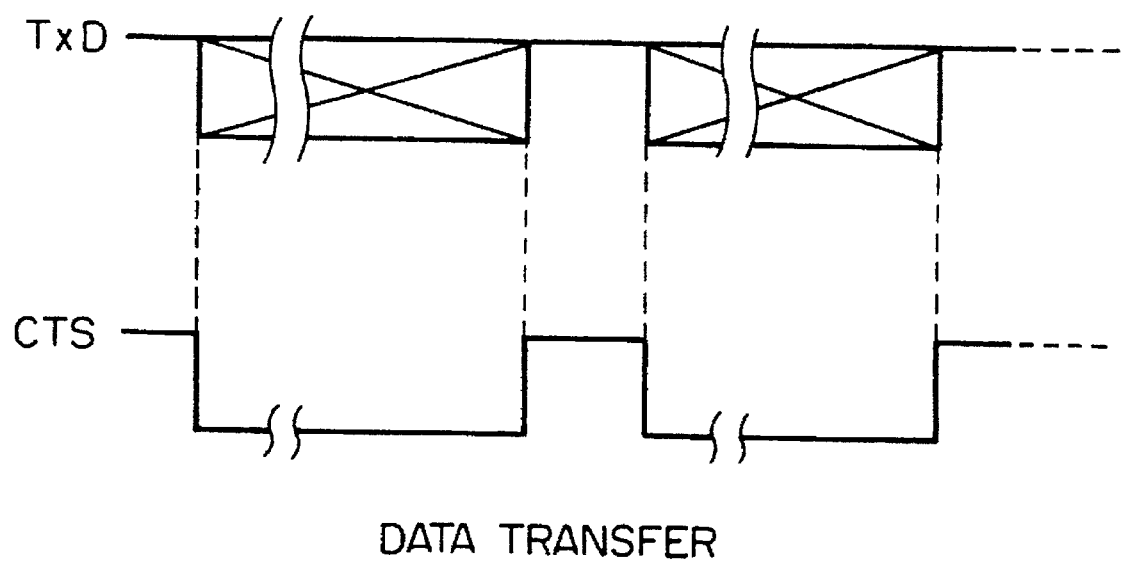
FIG. 4 is a timing chart representative of data transfer usually occurring in the embodiment.

More specifically, as shown in FIG. 3, the I/F 124 of the camera 10 has a driver 124-1 and a receiver 124-2 while the I/F 202 of the equipment 20 has a receiver 202-1 and a driver 202-2. The driver 124-1 has its non-inverting output and inverting output respectively connected to the non-inverting input and inverting input of the driver 202-1 by a data line 30-1 included in the cable 3. In this configuration, an output RxD corresponding to data TxD sent from the camera 10 is fed to the equipment 20. Likewise, the inverting output and non-inverting output of the driver 202-2 are respectively connected to the inverting input and non-inverting input of the receiver 124-2 by a control line 30-2. When the equipment 20 sends a control signal RTS to the camera 10 over the control line 30-2, a corresponding output CTS is input to the camera 10. FIG. 4 demonstrates the ordinary data transfer mode operation of the system including the camera 10 and equipment 20. As shown, the camera 10 is allowed to send the image data TxD over the data line when the control signal RTS from the equipment 20, i.e., the control output CTS of the camera 10 is in the OFF state. The camera 10 is inhibited from sending the image data TxD when the control output CTS is in the ON state. The procedure shown in FIG. 4 is repeated to cause data to be selectively sent from the camera 10 to the equipment 20, depending on the status of the equipment 20.

Figure 5:
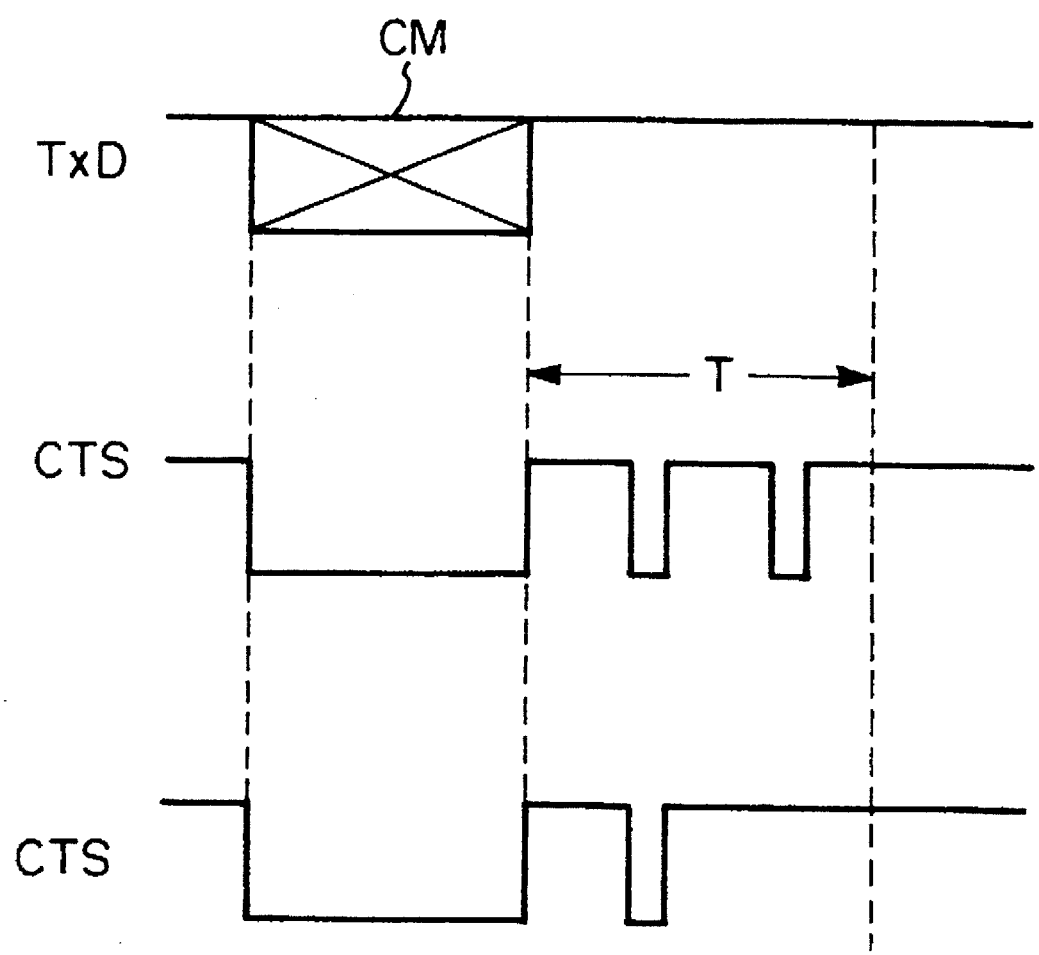
FIG. 5 is a timing chart representative of signals to appear when a transfer rate is to be set in the embodiment.

As shown in FIG. 5, in the illustrative embodiment, the camera 10 sends the transfer rate set command, labeled CM, over the data line before sending the image data. When the equipment 20 having received the command CM sends two consecutive pulses to the camera 10 over the control line within a period of time T during which the control signal remains in the ON state, the camera 10 receives them as an answer signal CTS showing that the equipment 20 has accepted the above command CM. When the equipment 20 sends a single pulse within the period of time T, i.e., when it does not accept the command CM, the camera 10 sends the next transfer rate set command. The period of time T is selected to be substantially 1 millisecond.

Referring again to FIG. 2, the equipment 20 should preferably include, in addition to the personal computer 204, a display 206, a hard disk or similar memory device 208, a keyboard or similar input unit 210, and a printer 212. The display 206 displays the image data received from the camera 10 and reproduced. The memory device 208 stores the received image data while the printer 212 prints out the reproduced image data. These units 206–212 are connected to the computer 204, as illustrated. In the embodiment, the hardware architecture of the computer 204 is open to choice so long as the computer 204 is loaded with software capable of reproducing the image data.

Figure 6:
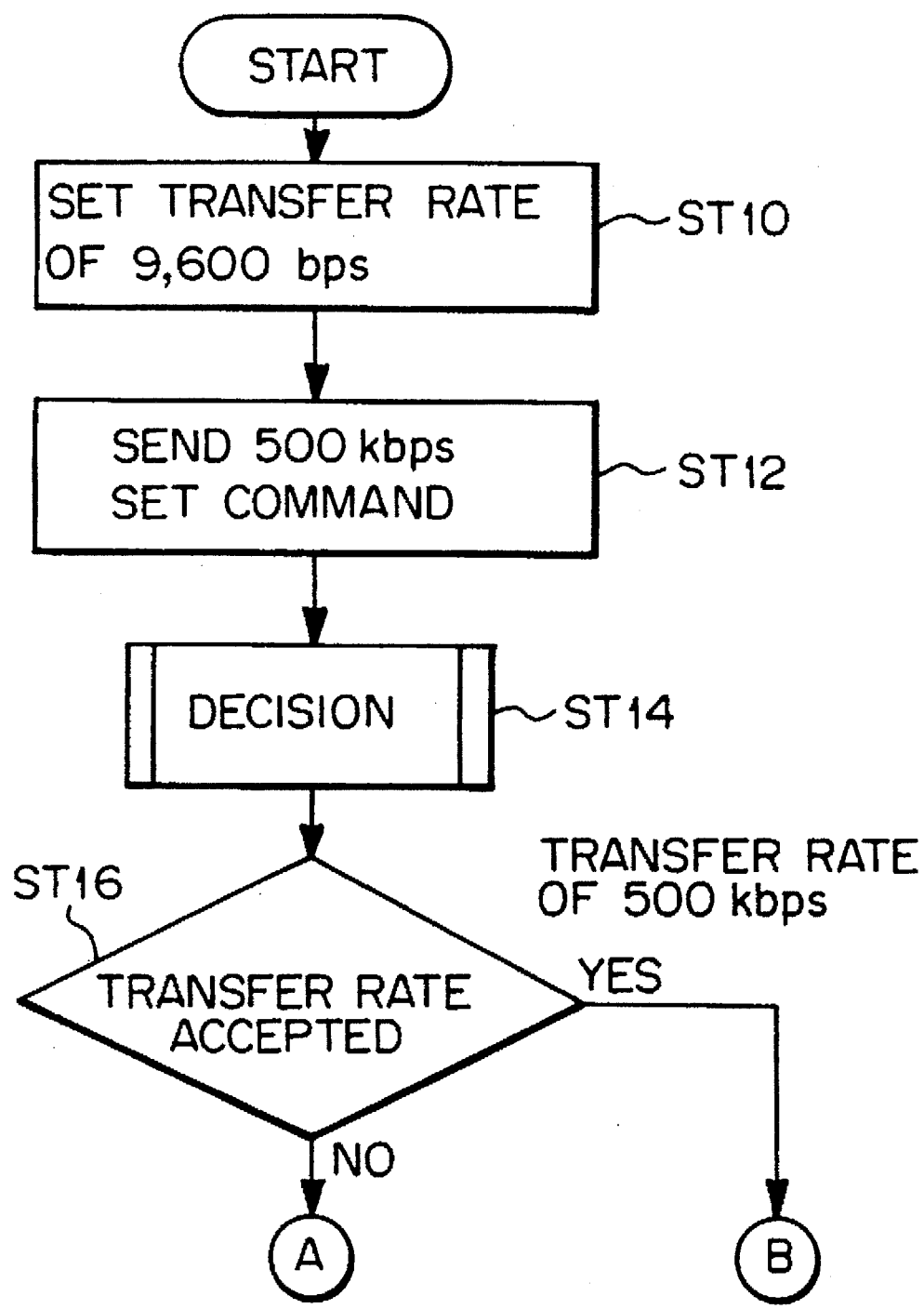
FIGS. 6 and 7 demonstrate in combination a specific operation of the embodiment for setting a transfer rate.
Figure 7:
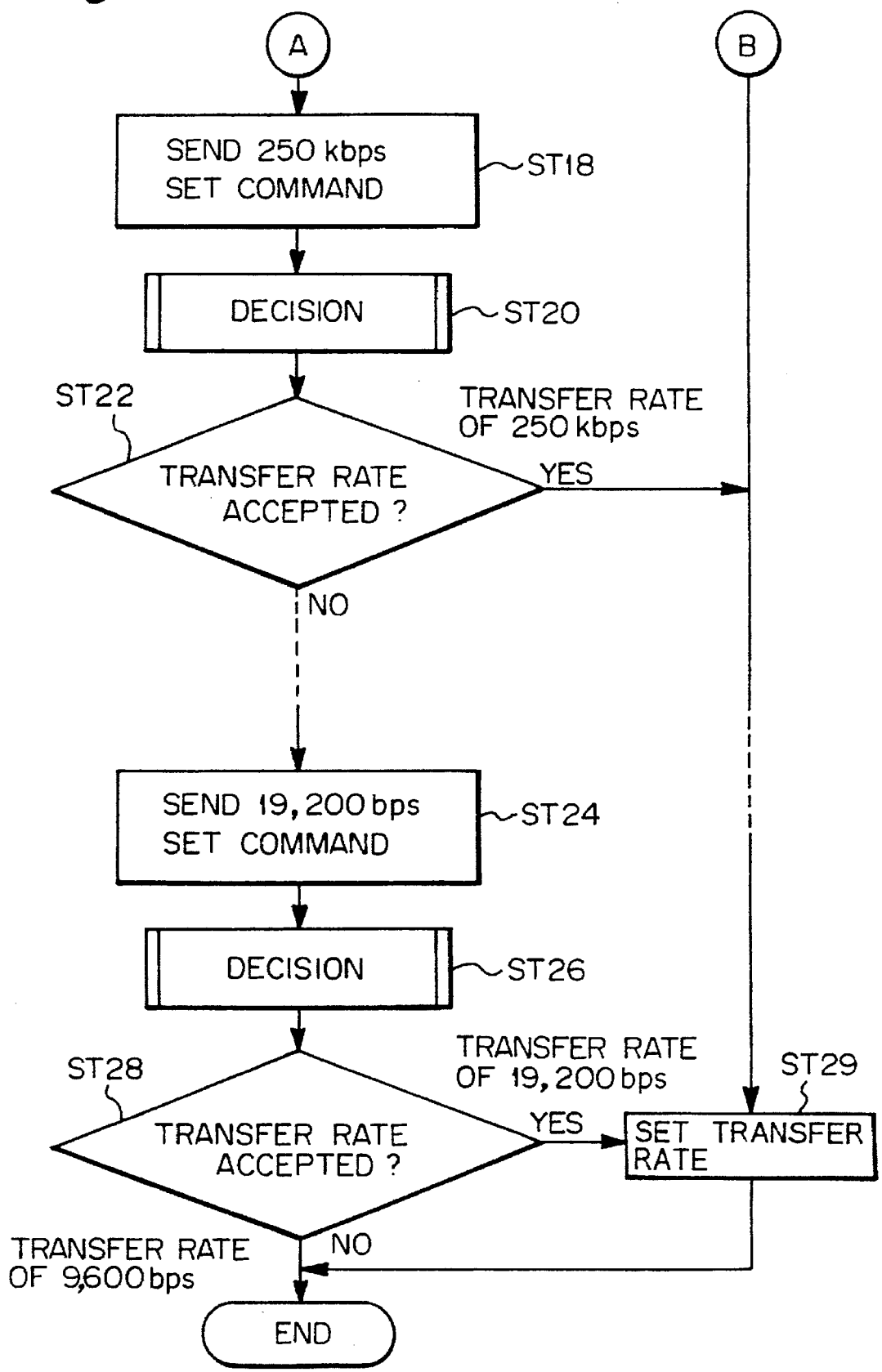

A reference will be made to FIGS. 6–8 for describing a specific operation of the image data transfer system together with a specific operation of the camera 10. First, the camera 10 is repeatedly operated to shoot a plurality of subjects before sending image data to the equipment 20. The subjects picked up are recorded in the memory card 120.

Specifically, the operator of the camera 10 selects a shoot mode on a mode select button, not shown. The mode select button delivers the mode set signal MS representative of the shoot mode to the CPU 130, thereby causing the camera 10 to be set in the shoot mode. When the operator pushes the previously mentioned release button, the shutter 104 is opened with the result that an image representative of the subject is incident to the image sensor 108 via the lens 102, shutter 104, and iris 106. In response, the image sensor 108 generates the RGB image signals representative of the subject. The signal processor 110 clamps the black level and corrects the white balance and gamma characteristic of the individual image signal. The resulting adequate image signals are applied to the ADC 112. At this instant, coefficients for the correction of white balance and gamma characteristic are fed from the CPU 130 to the signal processor 110 via the DAC 134. Likewise, a coefficient necessary for analog-to-digital conversion is fed from the CPU 130 to the ADC 112 via the DAC 134.

The ADC 112 transforms the RGB image signals to corresponding image data each having a valid number of bits, and then feeds them to the Y/C processor 114. The Y/C processor 114 converts the input image data to YC image data each including a luminance signal Y and chrominance signals C. The image data output from the Y/C processor 114 are written to the frame memory 118 via the memory controller 116. When the image data stored in the memory 118 should be compressed, they are sequentially read out of the memory 118 via the memory controller 116 under the control of the CPU 130 and fed to the compander 122. The compressed image data output from the compander 122 are written to the memory card 120 via the memory controller 116.

The above procedure is repeated to shoot a plurality of subjects and store image data representative of the subjects in the card 120. The image data stored in the card 120 are transferred to the personal computer or similar equipment 20 over the cable 30, as follows.

After the camera 10 and equipment 20 have been connected by the cable 30, a data transfer mode is selected on the mode select button provided on the camera 10. In response, in a step ST10 shown in FIG. 6, the CPU 130 prepares for the transmission of a transfer rate set command to the equipment 20 by setting the I/F 124 to a data transfer rate lower than or equal to, e.g., the RS-422 nominal rate. The low transfer rate may be 9,600 bps by way of example. Subsequently, the CPU 130 sends, at the transfer rate of 9,600 bps, the first transfer rate set command indicative of a transfer rate of 500 kbps to the equipment 20 via the communication I/F 124 over the data line of the cable 30 (step ST12). In the embodiment, the first transfer rate set command is indicative of the highest transfer rate, as stated above. On receiving the transfer rate set command, the equipment 20 analyzes it and determines whether or not the equipment 20 is adaptive to the indicated transfer rate. Then, the equipment 20 introduces a single pulse or two pulses in the control signal while the control signal is in the ON state, as stated previously. The single pulse or two pulses are sent from the equipment 20 to the camera 10 as an answer signal over the control line of the cable 30. In the camera 10, the CPU 130 receives the answer signal via the communication I/F 124, counts the pulses, and then determines whether or not the equipment 20 is adaptive to the transfer rate of 500 kbps (step ST14).

Figure 8:
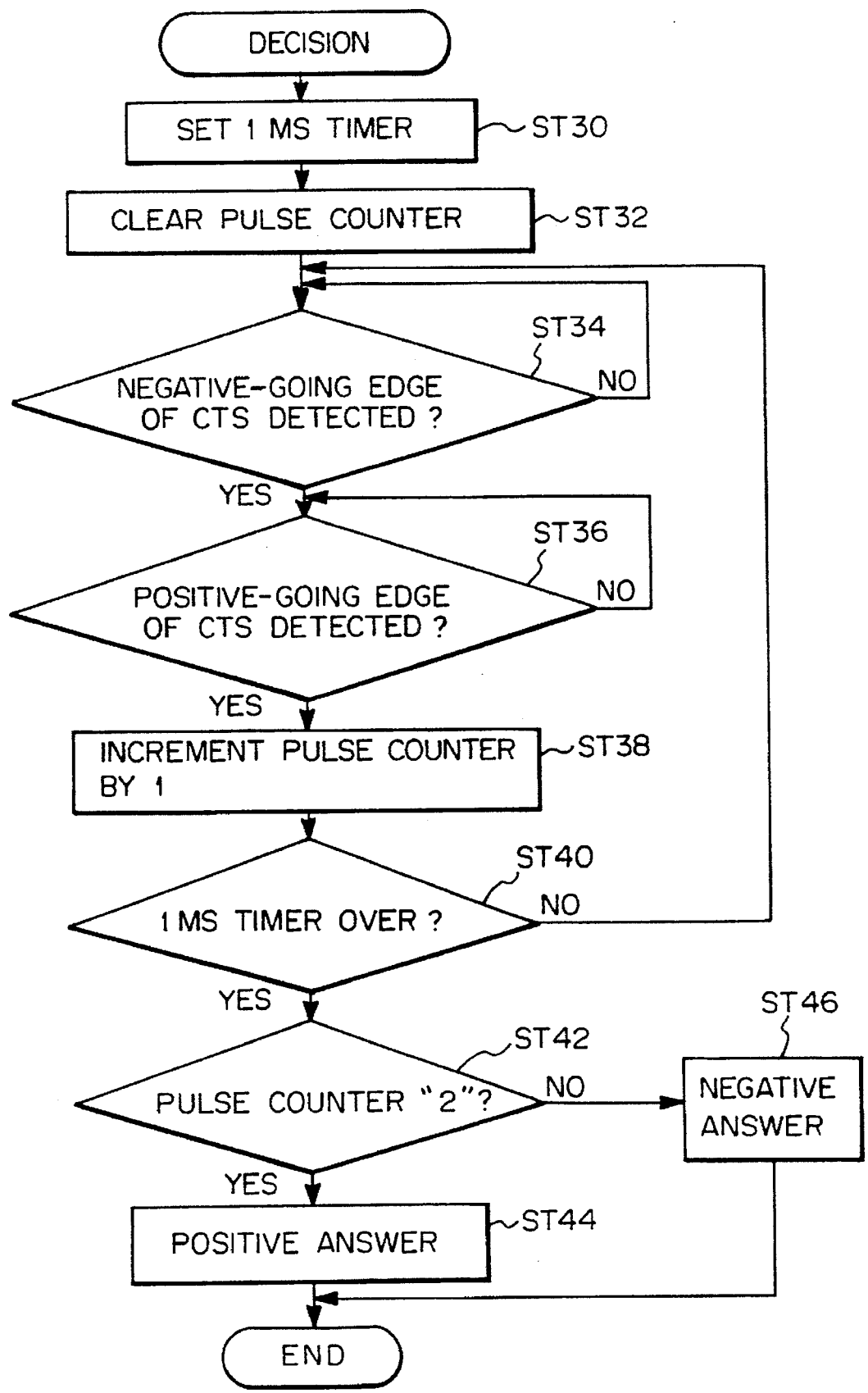
FIG. 8 is a flowchart showing a part of the procedure of FIGS. 6 and 7 in detail.

How the CPU 130 makes the above decision (step ST14) is shown in FIG. 8 in detail. As shown, the CPU 130 sets 1 millisecond in the timer thereof after the transmission of the transfer rate set command (step ST30), and then resets the pulse counter (step ST32). Subsequently, the CPU 130 determines whether or not the receiver of the communication I/F 124 has detected a negative-going edge of the control output CTS (step ST34). This is repeated until the answer of the step ST 34 goes positive (Yes). When the receiver has detected a negative-going edge of the control output CTS, the CPU 130 determines whether or not the receiver has detected a positive-going edge of the control output CTS (step ST36). This is also repeated until the answer of the step ST36 goes positive. If the answer of the step ST36 is Yes, the CPU 130 increments the pulse counter by 1 (one) (step ST38).

After the step ST38, the CPU 130 checks the timer to see if 1 millisecond has elapsed (step ST40). If 1 millisecond has not elapsed (No, step ST40), the CPU 130 repeats the loop including the steps ST34 through ST38. If the CPU 130 detects the next pulse, the CPU 130 further increments the pulse counter by 1. On the elapse of 1 millisecond (Yes, step ST40), the CPU 130 determines whether or not the count of the pulse counter is "2" (step ST42). If the answer of the step ST42 is Yes, the CPU 130 determines that the answer signal to the transfer rate set command is positive (step S44); if otherwise, it determines that the answer signal is negative (step ST46).

Referring again to FIG. 6, the CPU 130 determines, based on the result of the step ST14, whether or not to set the transfer rate of 500 kbps. Specifically, the CPU 130 executes a step ST29 shown in FIG. 7, as indicated by an arrow B, if the answer of the step ST14 is Yes, or executes a step ST18 also shown in FIG. 7, as indicated by an arrow A, if it is No. In the step ST29, the CPU 130 sets the transfer rate of 500 kbps. In the step ST18, the CPU 130 sends the next transfer rate set command indicative of a transfer rate of 250 kbps to the equipment 20 via the communication I/F 124. In response, the equipment 20 again returns to the camera 10 a single pulse or two pulses as a part of the control signal held in the ON state. Then, the CPU 130 again counts the pulse or pulses received via the I/F 124 (step ST20), and then determines whether or not to set the transfer rate of 250 kbps (step ST22). If the answer of the step ST22 is Yes, the CPU 130 sets the transfer rate of 250 kbps; if otherwise, the CPU 130 sends another transfer rate set command indicative of a transfer rate lower than 250 kbps to the equipment 20, as in the previously stated step ST18. Thereafter, the CPU 130 receives an answer signal from the equipment 20, and determines whether or not to set the above transfer rate, as in the step ST20.

Assume that the CPU 130 does not receive a positive answer even after the above repeated procedure. Then, the CPU 130 sends the last transfer rate set command indicative of a transfer rate of 19,200 bps to the equipment 20 (step ST24). On receiving an answer signal to the command from the equipment 20, the CPU 130 determines whether or not the equipment 20 is adaptive to the transfer rate of 19,200 bps (step ST26). Then, the CPU 130 determines whether or not to set the transfer rate of 19,200 bps (step ST28). If the answer of the step ST28 is No, the CPU 130 sets the first transfer rate of 9,600 bps; if the equipment 20 is adaptive to any one of the transfer rates, the CPU 130 sets the transfer rate (step ST29).

After the CPU 130 has set the particular transfer rate to which the equipment 20 is adaptive in the communication I/F 124, the CPU 130 sequentially reads the image data out of the memory card 120 by controlling the memory controller 116. The image data are fed from the card 120 to the I/F 124 via the memory controller 116. The I/F 124 controls its driver so as to send the image data bit-serially over the cable 30. The equipment 20, therefore, receives the image signal via the receiver of its communication I/F 202 at the adequate rate. In the equipment 20, the image data are sequentially stored in the memory device 208. Thereafter, the stored image data may be expanded and then reproduced on the display 206, or may be printed out by the printer 212, as needed.

As stated above, in the illustrative embodiment, the camera 10 sequentially sends, before sending image data, transfer rate set commands each being indicative of a particular transfer rate to the equipment 20. The equipment 20 returns an answer signal to every transfer rate set command while the control signal thereof is in the ON level. Then, the camera 10 sends the image data to the equipment at the transfer rate which is accepted by the equipment 20. Particularly, when the operator is not informed of the transfer rate available with the equipment 20 beforehand, the camera 10 can automatically identify the transfer rate, and then send the image data at the identified transfer rate. This makes it unnecessary for the operator to examine the specifications of the equipment 20 connected to the camera 10, and then manipulate a dip switch or the like. In this manner, images picked up by the camera 10 can be immediately transferred to the equipment 20 over the cable 30.

In summary, in accordance with the present invention, an electronic still camera sends, prior to image data, a transfer rate set command indicative of a transfer rate to equipment connected to the camera. In response, the equipment returns an answer signal, i.e., a pulse or pulses as a part of a control signal so as to inform the camera of whether or not the equipment can accept the indicated transfer rate. Then, the camera sends the image data to the equipment at the transfer rate accepted by the equipment. Hence, it is possible for the equipment to readily receive the image data from the camera even if it is not exclusively constructed for use with the camera. In addition, the equipment can be connected to the camera in a short period of time even if it is of the kind customarily needed a substantial setting time.

While the present invention has been described with reference to the particular illustrative embodiment, it is not to be restricted by the embodiment. It is to be appreciated that those skilled in the art can change or modify the embodiment without departing from the scope and spirit of the present invention. For example, the personal computer 204 connected to the camera 10 may be replaced with a word processor or similar general-purpose signal processing equipment so long as it is capable of receiving images. Further, the camera 10 can send image data even to an outside recording unit or similar peripheral associated therewith and as distinguished from the general-purpose equipment.

While the communication I/Fs 124 and 202 have been shown and describing as including an RS-422 or similar balanced driver-receiver, it may include RS-232C, RS-423 or similar unbalanced driver-receiver, if desired.

Further, in the embodiment, the image data generated by the camera 10 are written to the memory card 120 and then sent to the equipment 20. Alternatively, the camera 10 may be provided with a shoot and send mode for sending an image picked up immediately to the equipment 20. Then, by selecting the shoot and send mode, it is possible to send the image data undergoing YC processing and, if necessary, compression immediately to the equipment 20. In this case, when the camera 10 brought into the shoot and send mode is connected to the equipment 20, the camera 10 will send a transfer rate set command in order to set an adequate transfer rate.

What is claimed is:

1. In an image data transfer system comprising an electronic still camera for generating an image signal representative of a subject picked up, and recording the image signal in a form of digital image data, and equipment separably connected to said camera and capable of receiving the image data from said camera, said camera comprising:

imaging means for shooting the subject to produce the image signal;

converting means for converting the image signal generated by said imaging means into the digital image data;

data processing means for executing predetermined image processing with the digital image data;

transmitting means for transmitting the image data output from said data processing means to said equipment; and control means for controlling said transmitting means to thereby control a transfer rate for transferring the image data to said equipment;

said equipment comprising:

receiving means connected to said transmitting means of said camera by a data line for transferring the image data, and a control line for reporting to said camera whether transfer of the image data from said camera to said equipment is permitted or inhibited by using a control signal selectively taking an ON state and an OFF state respectively;

wherein said control means of said camera controls, at the time of transfer of the image data to said equipment, said transmitting means to thereby send a transfer rate set command representative of the transfer rate of the image data to said equipment over said data line, and wherein said receiving means of said equipment reports to said camera whether or not said equipment accepts the transfer rate by varying the ON state and the OFF state of the control signal in a form of pulses.

2. A system in accordance with claim 1, wherein said control means controls said transmitting means to vary the transfer rate in a plurality of consecutive steps, sequentially sends, at the time of varying of the transfer rate, a plurality of transfer rate set commands each being indicative of a particular transfer rate to said equipment over said data line in a decrementing order, sets the rate accepted by said equipment, and then sends the image data to said equipment at the rate accepted.

3. A system in accordance with claim 1, wherein said camera further comprises data compressing means for compressing the digital image data by a preselected compression system, and wherein said transmitting means sends compressed image data output from said data compressing means to said equipment.

4. A system in accordance with claim 1, further comprising a memory card removably mounted to said camera for storing the digital image data, wherein said transmitting means sends the digital image data read out of said memory card to said equipment.

5. A system in accordance with claim 1, wherein said equipment comprises general-purpose equipment capable of including a personal computer.

6. A system in accordance with claim 1, wherein said equipment comprises a peripheral associated with said camera and capable of including a printer.

7. A system in accordance with claim 2, wherein said receiving means of said equipment selectively sends, on receiving each of the plurality of transfer rate set commands from said camera, a single pulse or a plurality of pulses to said camera over said control line as a part of the control signal, wherein said transmitting means of said camera feeds the single pulse or the plurality of pulses received over said control line to said control means, and wherein said control means determines the transfer rate on the basis of a number of pulses.

8. A system in accordance with claim 2, wherein said transmitting means and said receiving means each comprises a balanced driver-receiver.

9. A system in accordance with claim 2, wherein said transmitting means and said receiving means each comprises an unbalanced driver-receiver.

10. A system in accordance with claim 2, wherein said camera further comprises data compressing means for compressing the digital image data by a preselected compression system, and wherein said transmitting means sends compressed data output from said data compressing means to said equipment.

11. A system in accordance with claim 2, further comprising a memory card removably mounted to said camera for storing the digital image data, wherein said transmitting means sends the digital image data read out of said memory card to said equipment.

12. A system in accordance with claim 2, wherein said equipment comprises general-purpose equipment capable of including a personal computer.

13. A system in accordance with claim 2, wherein said equipment comprises a peripheral associated with said camera and capable of including a printer.

14. A system in accordance with claim 7, wherein said camera further comprises data compressing means for compressing the digital image data by a preselected compression system, and wherein said transmitting means sends compressed data output from said data compressing means to said equipment.

15. A system in accordance with claim 7, further comprising a memory card removably mounted to said camera for storing the digital image data, wherein said transmitting means sends the digital image data read out of said memory card to said equipment.

16. A system in accordance with claim 7, wherein said equipment comprises general-purpose equipment capable of including a personal computer.

17. A system in accordance with claim 7, wherein said equipment comprises a peripheral associated with said camera and capable of including a printer.

18. In an image data transfer system comprising an electronic still camera for generating an image signal representative of a subject picked up, and recording the image signal in a form of digital image data, and equipment separably connected to said camera and capable of receiving the image data from said camera, said camera comprising:

an image pick-up device for shooting the subject to produce the image signal;

an analog-to-digital converter for converting the image signal generated by said image pick-up device to the digital image data;

a data processor for executing predetermined image processing with the digital image data;

a transmitter for transmitting the image data output from said data processor to said equipment; and a control circuit for controlling said transmitter to thereby control a transfer rate for transferring the image data to said equipment;

said equipment comprising:

a receiver connected to said transmitter of said camera by a data line for transferring the image data, and a control line for reporting to said camera whether transfer of the image data from said camera to said equipment is permitted or inhibited by using a control signal selectively taking an ON state and an OFF state respectively;

wherein said control circuit of said camera controls, at the time of transfer of the image data to said equipment, said transmitter to thereby send a transfer rate set command representative of the transfer rate of the image data to said equipment over said data line, and wherein said receiver of said equipment reports to said camera whether or not said equipment accepts the transfer rate by varying the ON state and the OFF state of the control signal in a form of pulses.

19. A system in accordance with claim 18, wherein said control circuit controls said transmitter to vary the transfer rate in a plurality of consecutive steps, sequentially sends, at the time of varying of the transfer rate, a plurality of transfer rate set commands each being indicative of a particular transfer rate to said equipment over said data line in a decrementing order, sets the rate accepted by said equipment, and then sends the image data to said equipment at the rate accepted.

20. A system in accordance with claim 19, wherein said receiver of said equipment selectively sends, on receiving each of the plurality of transfer rate set commands from said camera, a single pulse or a plurality of pulses to said camera over said control line as a part of the control signal, wherein said transmitter of said camera feeds the single pulse or the plurality of pulses received over said control line to said control circuit, and wherein said control circuit determines the transfer rate on the basis of a number of pulses.

* * * * *